(12) United States Patent
Kashitani et al.

(10) Patent No.: US 6,266,537 B1
(45) Date of Patent: Jul. 24, 2001

(54) RADIO COMMUNICATION SYSTEM

(75) Inventors: Atsushi Kashitani; Katsuhiro Yamanaka, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/280,218

(22) Filed: Mar. 29, 1999

(30) Foreign Application Priority Data

Mar. 27, 1998 (JP) ................................................ 10-098274

(51) Int. Cl.$^7$ ...................................................... H04R 7/00
(52) U.S. Cl. .......................... 455/522; 455/422; 455/525; 370/346
(58) Field of Search ..................................... 455/522, 422, 455/525, 517, 524, 574, 436, 437, 438, 439, 550, 575, 456, 69; 370/345, 346

(56) References Cited

U.S. PATENT DOCUMENTS

| | | | |
|---|---|---|---|
| 4,989,204 | * 1/1991 | Shimizu et al. | 370/94.1 |
| 5,295,180 | * 3/1994 | Vendetti et al. | 379/59 |
| 5,345,500 | * 9/1994 | Breeden et al. | 379/63 |
| 5,349,632 | * 9/1994 | Nagashima | 379/61 |
| 5,513,243 | * 4/1996 | Kage | 379/58 |
| 5,896,561 | * 4/1999 | Schrader et al. | 455/67.1 |
| 5,910,947 | * 6/1999 | Fatamura | 370/332 |
| 6,026,301 | * 2/2000 | Satarasinghe | 455/346 |
| 6,088,590 | * 7/2000 | Anderson et al. | 455/437 |
| 6,108,544 | * 8/2000 | Dorenbosch et al. | 455/435 |
| 6,148,210 | * 11/2000 | Elwin et al. | 455/453 |

FOREIGN PATENT DOCUMENTS

| | | |
|---|---|---|
| 63-281532 | 11/1988 | (JP) . |
| 2-15740 | 1/1990 | (JP) . |
| 2-256332 | 10/1990 | (JP) . |
| 2-272831 | 11/1990 | (JP) . |
| 6-29897 | 2/1994 | (JP) . |
| 8107382 | 4/1996 | (JP) . |
| 8-340573 | 12/1996 | (JP) . |
| 9-182137 | 7/1997 | (JP) . |

OTHER PUBLICATIONS

Japanese Office Action issued Apr. 5, 2000 in a related application with English translation of relevant portions.

* cited by examiner

Primary Examiner—William Trost
Assistant Examiner—Congvan Tran
(74) Attorney, Agent, or Firm—Ostrolenk, Faber, Gerb & Soffen, LLP

(57) ABSTRACT

A radio communication system includes a plurality of base stations and a plurality of mobile stations belonging to the service areas covered by the radio zones respectively formed by the base stations and performs data communication by polling. Each base station includes a transmission output control section for controlling the transmission output of a polling signal to sequentially form a plurality of radio zones having different coverages, a section for receiving responses from the plurality of mobile stations to a plurality of polling signals having different transmission outputs and determining the position of each of the mobile stations in a specific one of the plurality of radio zones.

8 Claims, 11 Drawing Sheets

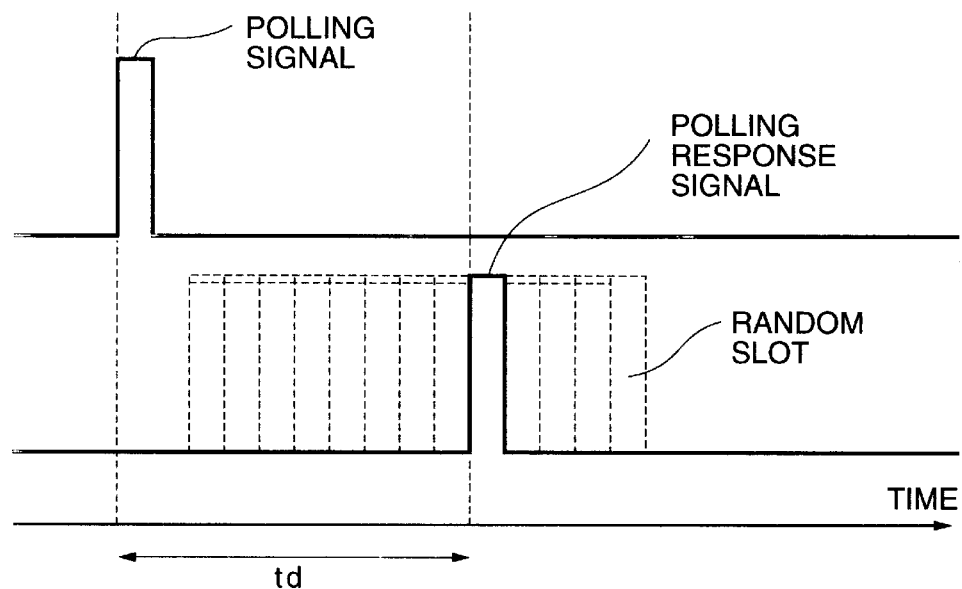

FIG. 14

|  | DISTANCE COVERED BY CURRENTLY RECEIVED POLLING SIGNAL | DISTANCE COVERED BY PREVIOUSLY RECEIVED POLLING SIGNAL | RESPONSE DETERMINATION RESULT |
| --- | --- | --- | --- |
| PATTERN 1 | LONG DISTANCE | LONG DISTANCE | RESPONSE |
| PATTERN 2 | LONG DISTANCE | SHORT DISTANCE | NO RESPONSE |
| PATTERN 3 | SHORT DISTANCE | LONG DISTANCE | RESPONSE |
| PATTERN 4 | SHORT DISTANCE | SHORT DISTANCE | RESPONSE |
| PATTERN 5 | LONG DISTANCE | N/A | RESPONSE |
| PATTERN 6 | SHORT DISTANCE | N/A | RESPONSE |

RADIO COMMUNICATION SYSTEM

BACKGROUND OF THE INVENTION

1. Field of the Invention

The present invention relates to a radio communication system and, more particularly, to a radio communication system which is comprised of a plurality of base stations and a plurality of mobile stations that can be connected to the base stations through radio channels and controls the transmission outputs of polling signals from the base stations to allow the base stations to transmit a plurality of types of polling signals having different transmission outputs, for example, to each other, at predetermined timings.

2. Description of the Prior Art

For example, in the conventional radio communication system disclosed in Japanese Unexamined Patent Publication No. 8-107382, each base station controls the transmission output. According to the characteristic feature of this system, when a mobile station connected to a given base station or located in a radio zone formed by a given base station receives a signal from another radio zone, the transmission output of the base station or mobile station as the destination of the signal from another radio zone is reduced through a private communication network.

FIG. 1 shows an example of the arrangement described in the above reference. Base stations $B_i$ and $B_{i+1}$ connected to each other through a private communication network respectively form radio zones $Z_i$ and $Z_{i+1}$. Mobile stations $T_j$ and $T_{j+1}$ are performing radio communication with the base station $B_i$ upon determining radio channels. A mobile station mobile station $T_{j+2}$ is performing radio communication with the base station $B_{i+1}$ upon determining a radio channel.

Since the radio zone formed by the base station $B_{i+1}$ is large, the mobile station $T_{j+1}$ receives a signal from the base station $B_{i+1}$ as well. At this time, the mobile station $T_{j+1}$ processes the signal from the base station $B_{i+1}$ to identify and specify the base station $B_{i+1}$ as a transmission source, and makes a request to reduce the transmission output of the base station $B_{i+1}$ through the base station $B_i$ and the private communication network. In response to this request, the private communication network reduces the transmission output of the base station $B_i+$, and reduces the radio zone formed by the base station $B_i+$, as shown in FIG. 1.

With this transmission output control, each base station or mobile station can construct a satisfactory communication environment without being interfered by any signals from other adjacent radio zones.

As a radio communication system in which a base station polls a plurality of mobile stations to collect data, for example, the system disclosed in Japanese Unexamined Patent Publication No. 2-15740 or 6-29897 is available. According to Japanese Unexamined Patent Publication No. 2-15740, a base station communicates with all mobile stations to collect data, and sequentially collects data. For example, this system can be applied to collection of data from all mobile stations, e.g., collection of questionnaire.

The system disclosed in Japanese Unexamined Patent Publication No. 6-29897 has a characteristic feature in that a base station transmits a polling signal with a polling start number and a time slot count being added thereto. Assume that mobile stations T(1), T(2), ..., T(M) are present in the radio zone formed by a base station, and the base station transmits a polling signal with a polling start number N ($1 \leq N \leq M$) and a time slot count n ($1 \leq n \leq M-N+1$) being added thereto. In this case, only mobile stations A(N) to A(N+n) respond to this polling signal. With this operation, a plurality of mobile stations can be managed in units of small groups.

In the scheme disclosed in Japanese Unexamined Patent Publication No. 8-107382, to prevent communication interference between adjacent radio zones, the transmission output of a communication station (base or mobile station) located in one radio zone is reduced. This conventional scheme is effective when a combination of one base station and a plurality of mobile stations belonging thereto is almost fixed, and the mobile stations do not move to other radio zones. If, however, such a mobile station moves between a plurality of base stations, when the mobile station receives a signal from another base station or mobile station, it is not easy for the mobile station to identify the signal as a signal from a radio zone other than the zone in which the mobile station is located. In practice, it is difficult to control the transmission output.

Consider a case wherein the base stations $B_i$ and $B_{i+1}$ form adjacent radio zones $Z_i$ and $Z_{i+1}$, and the mobile station $T_{j+1}$ is located near the periphery of the radio zone $Z_{i+1}$ and forms a radio zone $Z(T_{j+1})$. The mobile station $T_j$ belonging to the base station $B_i$ receives a signal from the radio zone $Z(T_{j+1})$, and hence makes a request to reduce the radio zone formed by the mobile station $T_{j+1}$ through the base station $B_i$ and a private communication network. As a result, a transmission signal from the mobile station $T_{j+1}$ cannot reach the base station $B_{i+1}$, and data communication with the base station $B_{i+1}$ cannot be performed.

In the radio communication system disclosed in Japanese Unexamined Patent Publication No. 2-15740, even when data needs to be transmitted to a specific mobile station, all the mobile stations in the system must be polled, resulting in a very long processing time. As an example of the countermeasures against this problem, the radio communication system disclosed in Japanese Unexamined Patent Publication No. 6-29897 is available. In this system, mobile stations are sequentially polled in groups by using idle time for processing other than polling. In this case as well, it takes a very long processing time to poll all the mobile stations.

SUMMARY OF THE INVENTION

The present invention has been made in consideration of the above situation, and has as its object to provide a radio communication system which can perform efficient data communication between base stations and mobile stations by arranging an apparatus capable of specifying the relative positional relationship between the respective base stations and the respective mobile stations.

In order to achieve the above object, according to the first main aspect of the present invention, there is provided a radio communication system which comprises a plurality of base stations and a plurality of mobile stations belonging to service areas covered by radio zones respectively formed by the base stations and performs data communication by polling, each of the plurality of base stations comprising transmission output control means for controlling a transmission output of a polling signal to sequentially form a plurality of radio zones having different coverages, and means for receiving responses from the plurality of mobile stations to a plurality of polling signals having different transmission outputs and determining a position of each of the mobile stations in a specific one of the plurality of radio zones.

According to the second main aspect of the present invention, there is provided a radio communication system which comprises a plurality of base stations and a plurality of mobile stations belonging to service areas covered by radio zones respectively formed by the base stations and performs data communication by polling, each of the plurality of base stations comprising transmission output control means for controlling a transmission output of a polling signal to alternately transmit a long-distance polling signal having a strong transmission output and a short-distance polling signal having a weak transmission output, thereby alternately forming large and small radio zones, and means for receiving responses from the plurality of mobile stations to the long- and short-distance polling signals and determining a specific one of the large and small zones in which each of the mobile stations is located.

The first and second main aspects have the following auxiliary aspects.

Each of the different polling signals has an ID for identifying a base station that has originated the polling signal and a transmission output value.

The mobile station transmits to a corresponding base station a response signal with an output value corresponding to the transmission output value of a received polling signal.

The mobile station comprises means for determining, from an ID number of the base station and the transmission output which are obtained by receiving the polling signal, a specific one of the plurality of radio zones in which the mobile station is located and a specific one of the plurality of base stations which forms the radio zone in which the mobile station is located.

Each of the plurality of base stations continuously transmits only the long-distance polling signal without transmitting the short-distance polling signal when there is no mobile station that responds to the long- and short-distance polling signals.

Each of the plurality of mobile stations makes no response when the polling signal received following the short-distance polling signal is the long-distance polling signal.

When different data need to be transmitted to the plurality of mobile stations, each of the base stations preferentially transmits the data to a mobile station which is located in the large zone formed by each of the plurality of base stations but is not located in the small zone.

The small zones respectively formed by the plurality of base stations are arranged such that the small zones formed by the adjacent base stations do not overlap.

According to the radio communication system of the present invention, each base station transmits polling signals while controlling their transmission outputs so as to form two radio zones having different sizes, and can independently monitor the respective zones. For this reason, each base station can roughly discriminate the distribution of mobile stations located around the self-station and the relative distances to the respective mobile stations. Therefore, when an information service network for providing appropriate information for each mobile station is to be constructed, more precise information can be provided.

In addition, if the small zones formed by adjacent base stations do not overlap, a mobile station located in a given small zone can communicate with only one base station. The base station can therefore provide information unique to itself for the mobile station inside the small zone formed by the base station itself. If the large zones formed by base stations overlap, an area which cannot be covered by any base station can be eliminated in the radio zone.

If there is no mobile station that responds to a long-distance polling signal, i.e., no mobile station is present in the large zone, control can be performed not to transmit any short-distance polling signal. Therefore, any unnecessary short-distance polling signal need not be transmitted.

In addition, since each mobile station can be controlled not to respond to any long-distance polling signal that is received after the reception of a short-distance polling signal, the mobile stations in the radio zone formed by the base station can be classified into a group located inside the small zone and a group located outside the small zone. If, for example, many mobile stations are present in a radio zone, this grouping can reduce the possibility of interference.

Furthermore, when a base station needs to simultaneously transmit different data to a plurality of mobile stations, since the data are preferentially provided to mobile stations located outside the small zone, the data can be transmitted more reliably to the mobile stations which are located outside the small zone and hence may move outside the radio zone of the base station with higher possibility than mobile stations inside the smaller zone.

The above and many other objects, features and advantages of the present invention will become manifest to those skilled in the art upon making reference to the following detailed description and accompanying drawings in which preferred embodiments incorporating the principles of the present invention are shown by way of illustrative examples.

BRIEF DESCRIPTION OF THE DRAWINGS

FIG. 8 is a view showing an example of the data format of a polling signal;

FIG. 9 is a timing chart showing the output timing of a polling response signal;

FIG. 10 is a view showing an example of the data format of a polling response signal;

FIG. 14 is a table showing the response determination results obtained by a response determination section in the mobile station in FIG. 13.

DETAILED DESCRIPTION OF THE PREFERRED EMBODIMENTS

A few preferred embodiments of the present invention will be described below with reference to the accompanying drawings.

A radio communication system of the present invention is comprised of base stations $B_1, B_2, \ldots, B_n$ which are fixed or semi-fixed in a movable state and mobile stations $T_1, T_2, \ldots, T_m$ which move inside and outside the radio zones formed by the base stations $B_1, B_2, \ldots, B_n$. Each of the base stations $B_1, B_2, \ldots, B_n$ forms a radio zone by transmitting a polling signal. When a mobile station enters this radio zone and receives a polling signal from the base station, the mobile station makes some response to the base station to notify the base station of the presence of the mobile station. When data to be transmitted to the base station or mobile station is generated, the polling signal is temporarily stopped by corresponding communication control, and data communication is performed.

Figure 3:
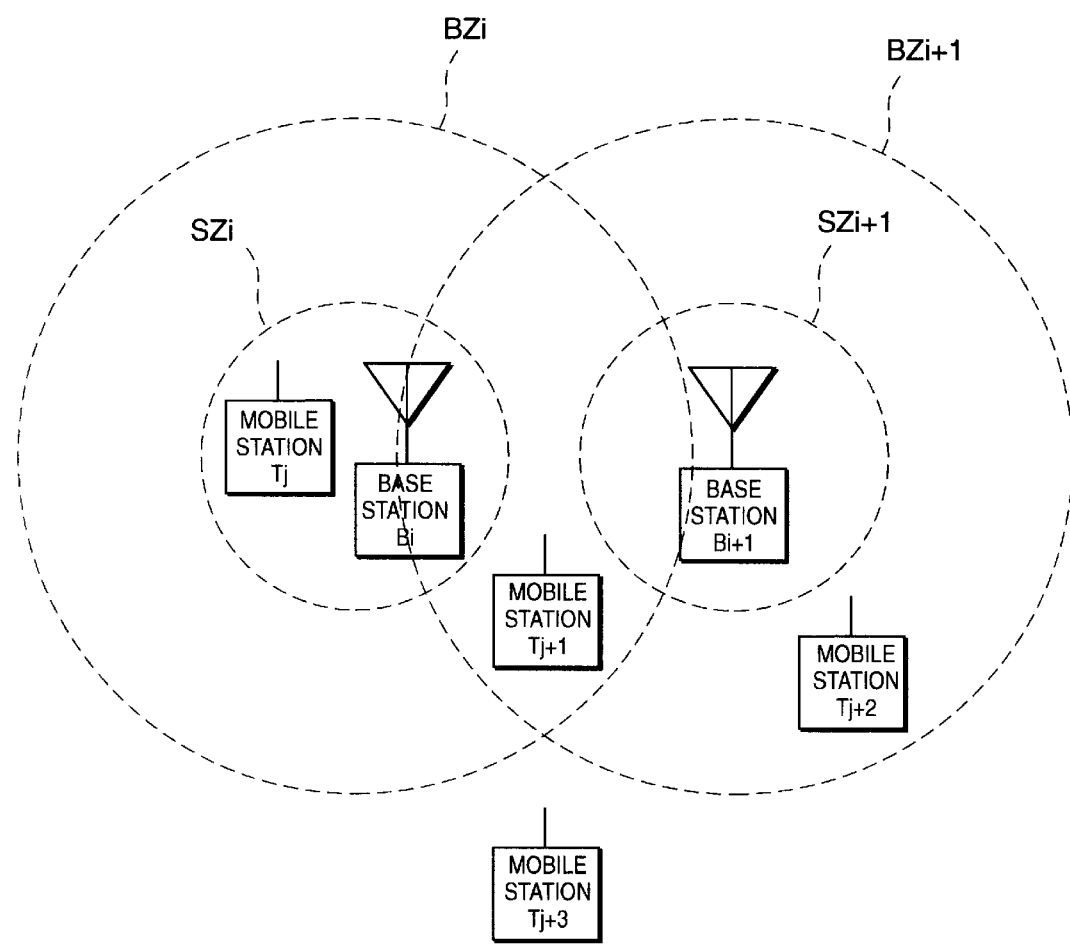
FIG. 3 is a schematic view showing the arrangement of a radio communication system according to the first embodiment of the present invention.

FIG. 3 shows the first embodiment of the radio communication system of the present invention, and more specifically, adjacent base stations $B_i$ and $B_{i+1}$, of the base stations $B_1, B_2, \ldots, B_n$, and mobile stations $T_j, T_{j+1}, T_{j+2}$, and $T_{j+3}$ located around the base stations. FIG. 3 does not show base stations other than the base stations $B_i$ and $B_{i+1}$, and mobile stations other than the mobile stations $T_j, T_{j+1}, T_{j+2}$, and $T_{j+3}$.

Figure 4:
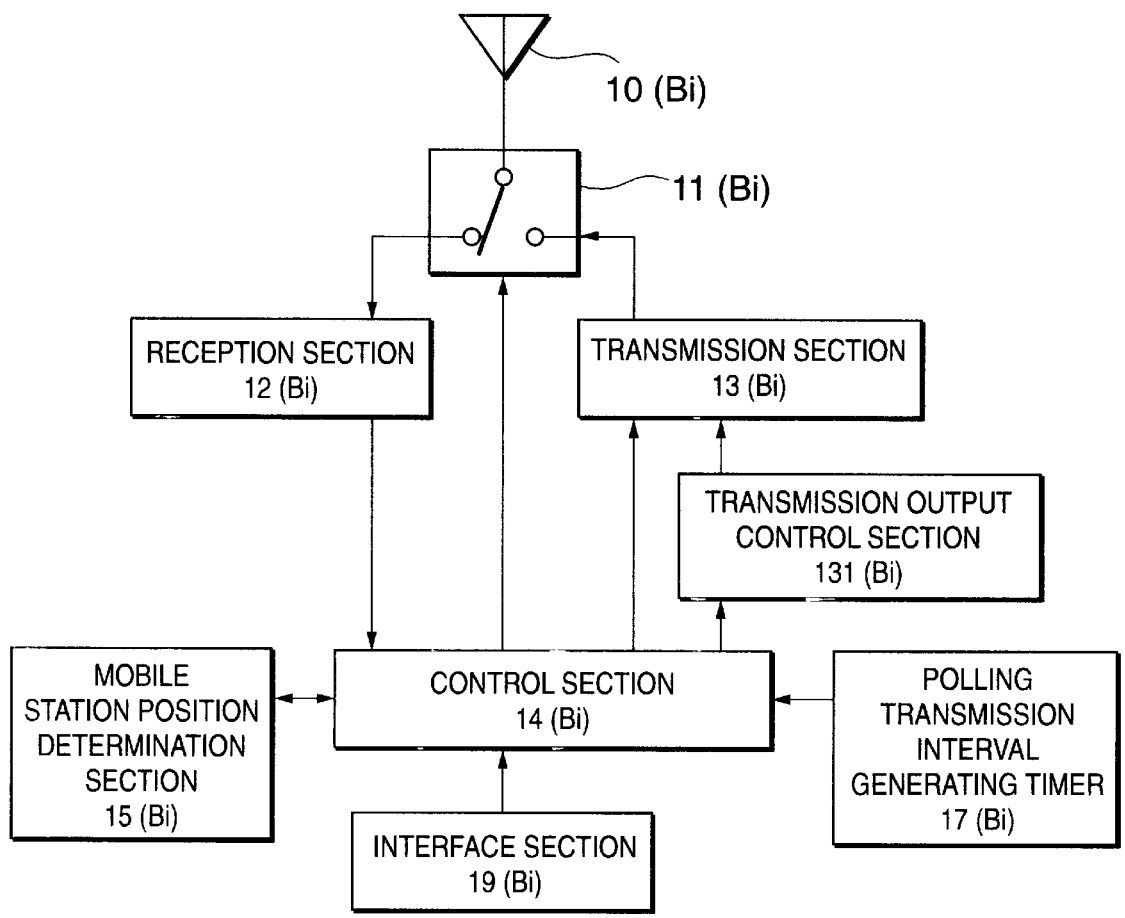
FIG. 4 is a block diagram showing the arrangement of a base station in the first embodiment shown in FIG. 3.

FIG. 4 shows an example of the arrangement of the base station $B_i$ ($i=1, 2, \ldots, n$). The base station $B_i$ includes an antenna $10(B_i)$ for transmitting a polling signal to mobile stations and transmitting/receiving data, a reception section $12(B_i)$ for receiving data, a transmission section $13(B_i)$ for transmitting a polling signal and data, and a transmission output control section $131(B_i)$ for controlling the transmission output of the transmission section $13(B_i)$.

The base station $B_i$ further includes a control section $14(B_i)$ for controlling the overall base station $B_i$, a mobile station position determination section $15(B_i)$ for determining the position of each mobile station in the radio zone in accordance with a response from each mobile station to a polling signal, a polling transmission interval generating timer $17(B_i)$ for generating time intervals at which polling signals are transmitted, a switch $11(B_i)$ for switching the transmission/reception state of the base station $B_i$ under the control of the control section $14(B_i)$, and an interface section $19(B_i)$ connected to, for example, a network that connects base stations.

Figure 5:
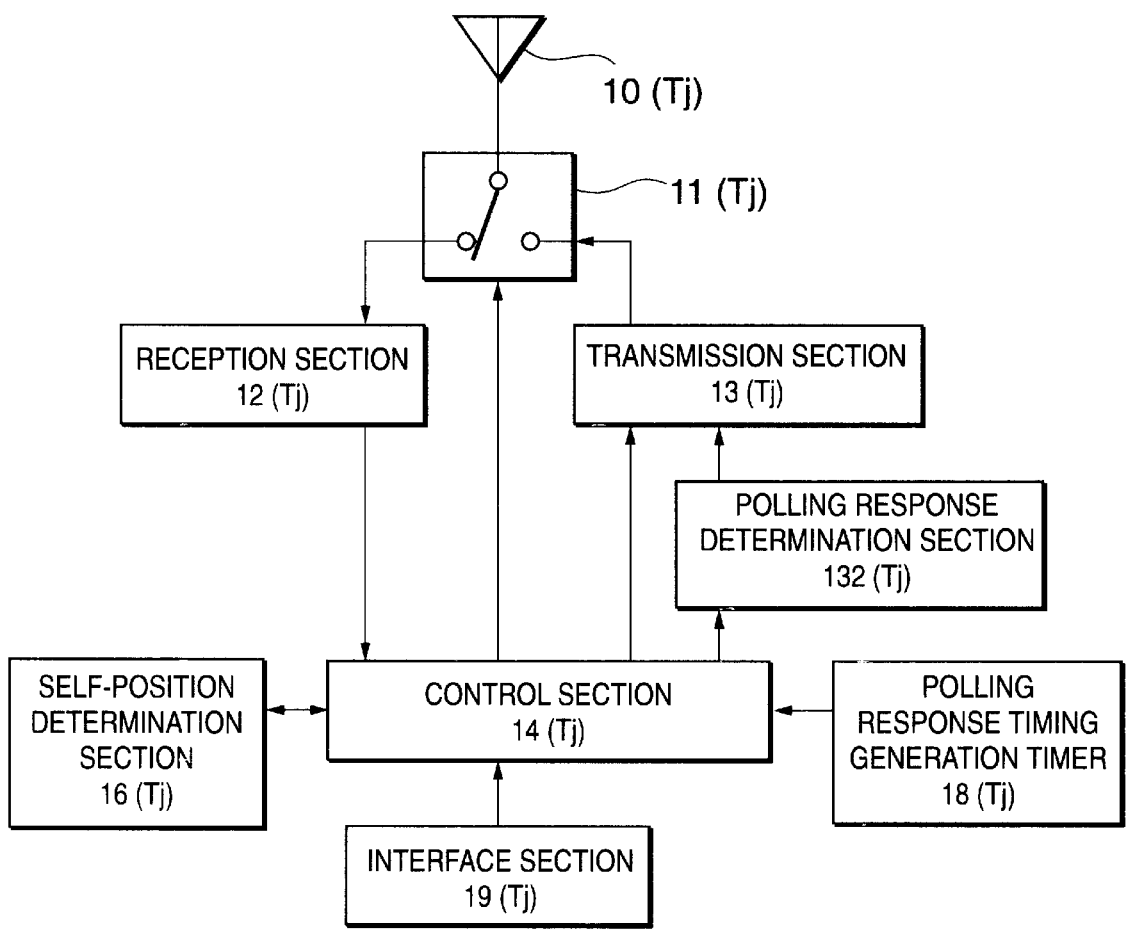
FIG. 5 is a block diagram showing the arrangement of a mobile station according to the first embodiment in FIG. 3.

FIG. 5 shows an example of the mobile station $T_j$ ($j=1, 2, \ldots, m$). The mobile station $T_j$ includes an antenna $10(T_j)$ for receiving a polling signal from the base station $B_i$ and transmitting/receiving data, a reception section $12(T_j)$ for receiving a polling signal and data, a transmission section $13(T_j)$ for transmitting data, and a pooling response determination section $132(T_j)$ for determining whether to respond to a polling signal from the base station $B_i$.

The mobile station $T_j$ further includes a control section $14(T_j)$ for controlling the overall mobile station $T_j$, a self-position determination section $16(T_j)$ for determining the position of the self-station in the radio zone from the transmission output value obtained from a polling signal from the base station $B_i$, a polling response timing generation timer $18(T_j)$ for generating the timing of a response to a polling signal, a switch $11(T_j)$ for switching the transmission/reception state of the mobile station $T_j$ under the control of the control section $14(T_j)$, and an interface section $19(T_j)$ connected to a display, input button, or the like.

In the base station $B_i$ in FIG. 4, the control section $14(B_i)$ controls the polling transmission interval generating timer $17(B_i)$ to generate the timing of transmission of a polling signal. In accordance with this timing, the control section $14(B_i)$ sends, to the transmission section $13(B_i)$, an instruction to transmit a polling signal.

Figure 6:
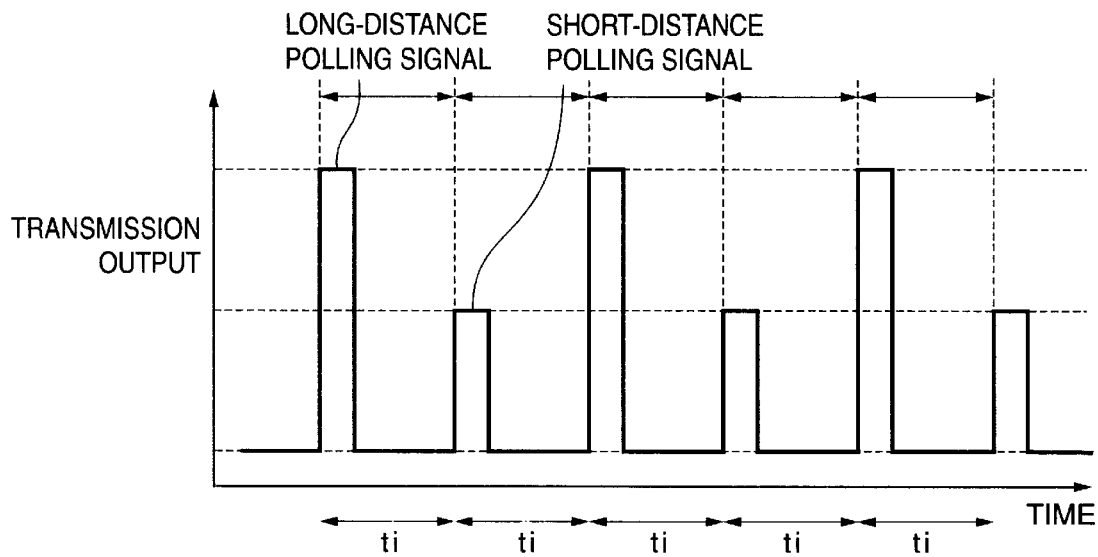
FIG. 6 is a timing chart showing how polling signal transmission output control is performed.

The control section $14(B_i)$ controls the transmission output control section $131(B_i)$ to adjust the transmission output of a polling signal, as shown in FIG. 6. FIG. 6 shows a case wherein polling signals are output at predetermined intervals (time ti). However, the control section $14(B_i)$ may control the polling transmission interval generating timer $17(B_i)$ to transmit polling signals irregularly instead of transmitting them at predetermined intervals.

The transmission section $13(B_i)$ changes the transmission output of a polling signal in accordance with the transmission output value sent from the transmission output control section $131(B_i)$, and transmits the polling signal through the switch $11(B_i)$ and the antenna $10(B_i)$. At this time, the switch $11(B_i)$ has already been switched to the transmission section $13(B_i)$ side. The switch $11(B_i)$ is switched to the transmission side when a polling signal or other data is to be transmitted, but is always switched to the reception side except for such an occasion.

Figure 1:
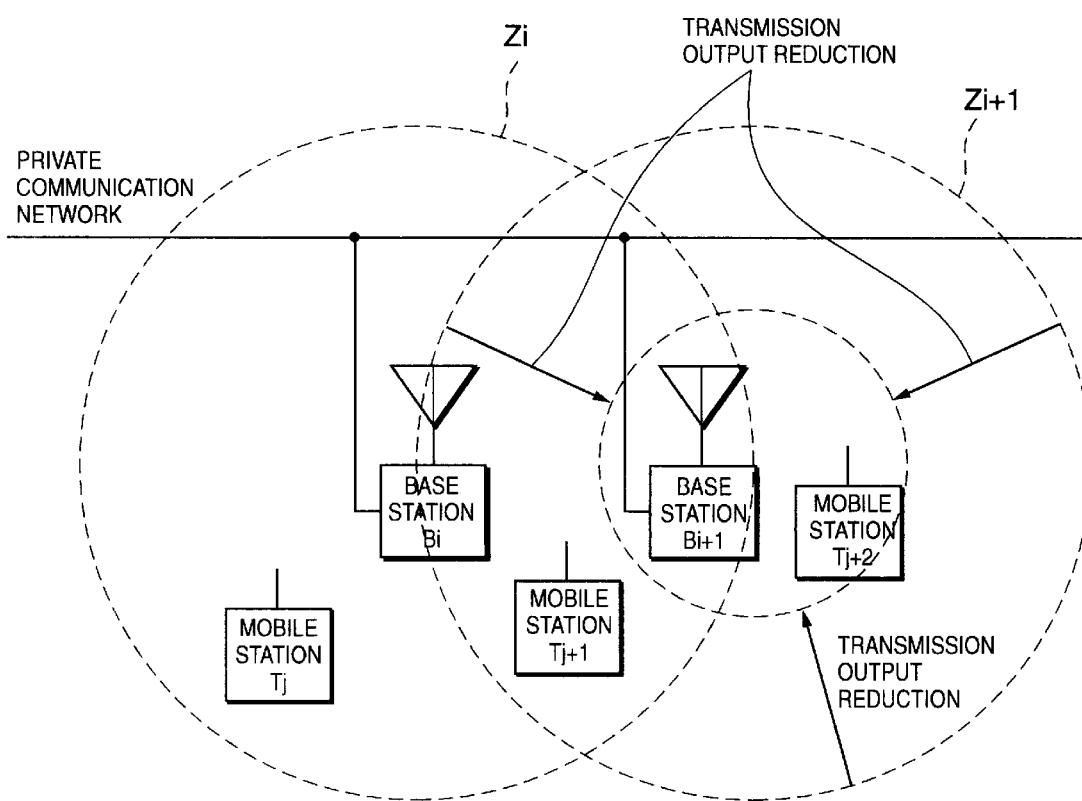
FIG. 1 is a schematic view showing an example of the arrangement of a conventional radio communication system.
Figure 2:
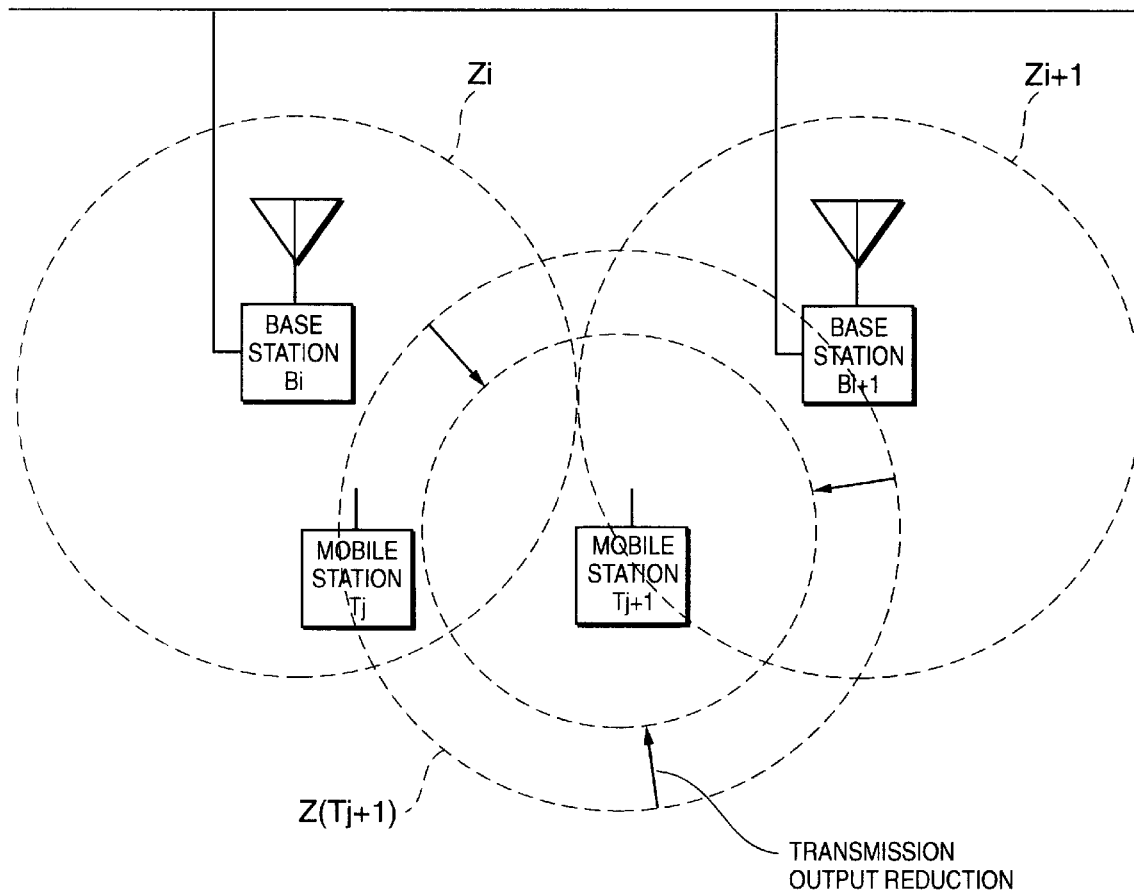
FIG. 2 is a view for explaining a problem in the prior art.
Figure 7:
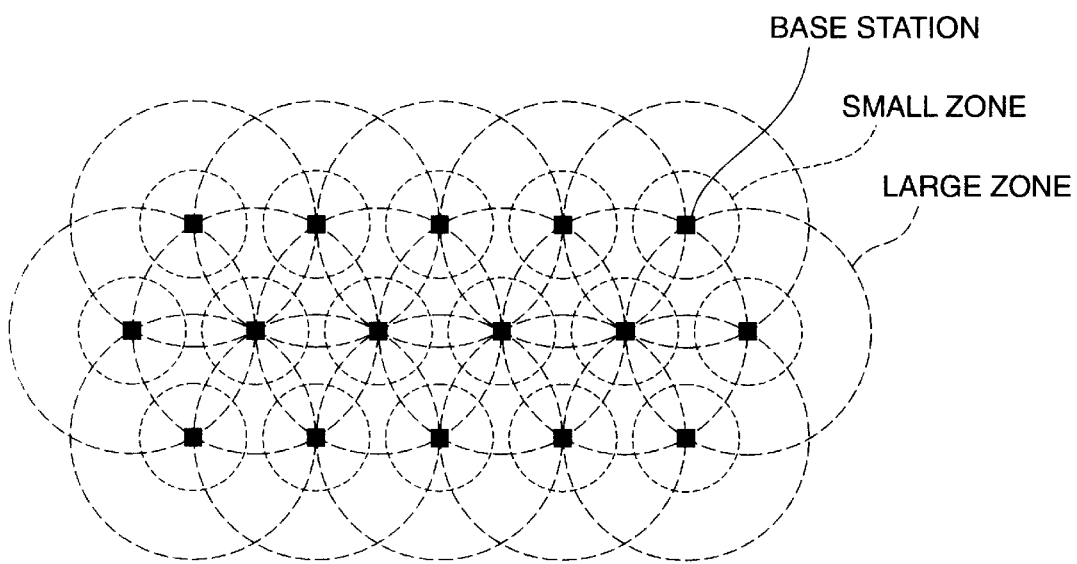
FIG. 7 is a view showing a plurality of base stations and the large and small zones formed by the base stations in the present invention.

As shown in FIG. 6, the base station $B_i$ changes the transmission output of a polling signal to transmit a long-distance polling signal having a large transmission output and a short-distance polling signal having a small transmission output, thereby forming a radio zone constituted by a large zone $BZ_i$ having a large coverage and a small zone $SZ_i$ having a small coverage. At this time, as shown in FIG. 1 or 7, such radio zones are formed such that the small zones $SZ_i$ and $SZ_{i+1}$ formed by the adjacent base stations $B_i$ and $B_{i+1}$ do not overlap.

FIG. 8 shows an example of the data format of a polling signal transmitted from the base station $B_i$. The polling signal is made up of flags indicating the start and end of the polling signal, a base station ID for identifying the base station $B_i$ that has originated the polling signal, a transmission output value set when the polling signal is transmitted, and data consisting of other control codes and various information. The control section $14(B_i)$ generates a polling signal in accordance with this data format and sends it to the transmission section $13(B_i)$. This signal is then transmitted through the switch $11(B_i)$ and the antenna $10(B_i)$.

Upon reception of the polling signal from the base station, the mobile station $T_j$ processes the polling signal through the control section $14(T_j)$ to obtain the base station ID and the transmission output value. The control section $14(T_j)$ sends the base station ID and the transmission output value to the self-position determination section $16(T_j)$. The self-position determination section $16(T_j)$ processes the base station ID and the transmission output value to check whether the mobile station $T_j$ is located in the large or small zone in the radio zone formed by the base station.

When the mobile station $T_j$ receives the polling signal from the base station, the control section $14(T_j)$ instructs the polling response timing generation timer $18(T_j)$ to generate the timing of transmission of a polling response signal. As shown in FIG. 9, the polling response timing generation timer $18(T_j)$ generates a response timing td by randomly selecting one of random slots.

The control section $14(T_j)$ generates a polling response signal and sends it to the transmission section $13(T_j)$ in accordance with the response timing td. This signal is then transmitted through the switch $11(T_j)$ and the antenna $10(T_j)$. When a polling response signal or another data is to be transmitted, the switch $11(T_j)$ is switched to the transmission side, but is always switched to the reception side except for such an occasion.

The transmission timing of a polling response signal is set such that a plurality of slots are generated a predetermined period of time after reception of a polling signal, one slot is randomly selected from the generated slots, and the polling response signal is transmitted in the selected slot. The time required for the generation of random slots, the number of slots, and the time per slot remain constant throughout all the mobile stations. For this reason, polling response signals do not interfere with each other unless mobile stations that are to respond to the same polling signal select the same slot.

FIG. 10 shows an example of the data format of a polling response signal. The polling response signal is made up of flags indicating the start and end of the polling response signal, a mobile station ID for identifying the mobile station $T_j$ that has originated the polling response signal, a base station ID for identifying the base station that has received the polling response signal, and data consisting of other control codes and various information. The control section $14(T_j)$ generates a polling response signal in accordance with this data format and sends it to the transmission section $13(T_j)$. This signal is then transmitted through the switch $11(T_j)$ and the antenna $10(T_j)$.

Upon reception of the polling response signal from the mobile station, the base station $B_i$ processes the polling response signal through the control section $14(B_i)$ to obtain the mobile station ID. The mobile station position determination section $15(B_i)$ checks whether the received polling response signal is a response to a long-distance polling signal or short-distance polling signal, thereby checking whether the mobile station corresponding to the obtained mobile station ID is located inside or outside the small zone $SZ_i$ of the radio zone formed by the base station $B_i$.

Figure 11:
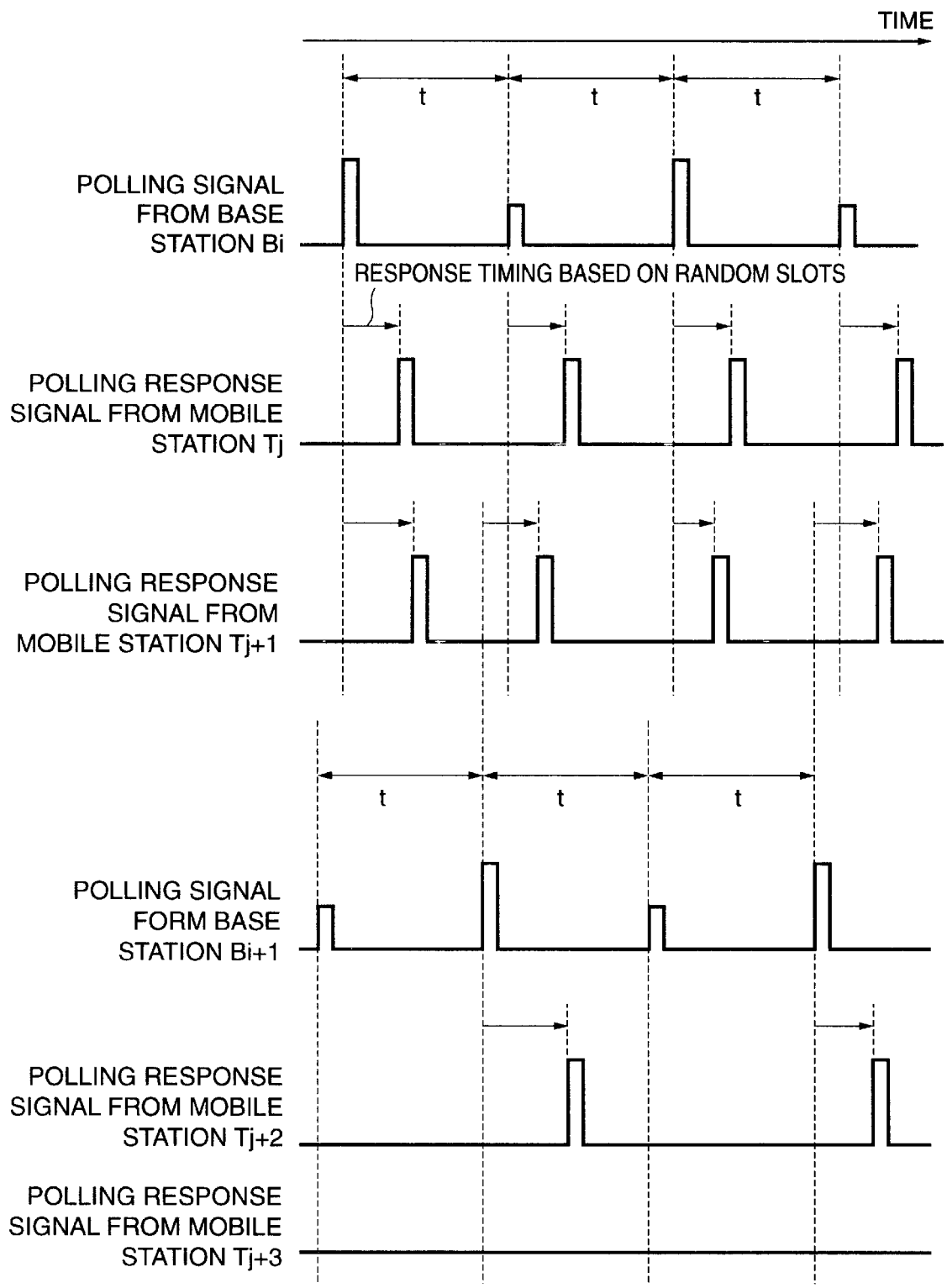
FIG. 11 is a timing chart showing how base stations and mobile stations exchange polling signals and polling response signals.

FIG. 11 shows how polling signals and polling response signals are exchanged in a case wherein base stations and mobile stations are arranged as shown in FIG. 3. FIG. 11 shows the output levels of the respective signals along the time axis extending to the right. The base stations $B_i$ and $B_{i+1}$ alternately originate long-distance polling signals and short-distance polling signals at predetermined time intervals t. At this time, synchronization is not necessarily established between the base stations $B_i$ and $B_{i+1}$.

Since the mobile station $T_j$ is located inside the small zone of the base station $B_i$, the mobile station $T_j$ receives both short- and long-distance polling signals from the base station $B_i$, and hence responds to them. Since the mobile station $T_{j+1}$ is located in a place where the large zone of the base station $B_i$ overlaps the large zone of the base station $B_{i+1}$, the mobile station $T_{j+1}$ responds to long-distance polling signals from the two base stations. The mobile station $T_{j+2}$ is located inside the large zone of the base station $B_{i+1}$, and hence responds to a long-distance polling signal from the base station $B_{i+1}$. The mobile station $T_{j+3}$ is located outside the radio zones of the two base stations, and hence originates no polling response signal.

As described above, since the timing of transmission of a polling response signal is generated by selecting one of random slots through the polling response timing generation timer, the probability that polling response signals responding to the same polling signal interfere with each other is low.

Referring to FIG. 11, the output level of each polling response signal is set to be almost equal to that of each long-distance polling signal. However, the output level of a polling response signal may be changed in accordance with the transmission output value contained in a polling signal. When a polling signal with a small transmission output value is received, the power consumed by the mobile station can be saved by returning a polling response signal with an output value similar to the transmission output value.

As described above, a polling signal and a polling response signal respectively contain the corresponding base station ID or mobile station ID. For this reason, when these signals are received, specific stations from which the signals originated can be determined. Therefore, the base station can determine whether the mobile station located around the base station is located inside or outside the small zone. The mobile station can also determine, from the received polling signal, the position of itself within a specific zone of a specific base station.

Although a given base station may receive a polling signal originated from another base station, since a base station ID is contained in the polling signal, the signal does not interfere with a polling response signal. Although a given mobile station may receive a polling response signal originated from another mobile station, since a mobile station ID is contained in the polling response signal, the signal does not interfere with a polling signal from a base station.

Information originated from the base station includes various data as well as a polling signal. When different data need to be transmitted from the base station $B_i$ to a plurality of mobile stations, the base station $B_i$ transmits first the data to mobile stations located outside the small zone in the radio zone formed by the base station $B_i$ on the basis of the determination result obtained by the mobile station position determination section $15(B_i)$. After completion of data communication to mobile stations outside the small zone, the base station $B_i$ transmits the data to mobile stations inside the small zone.

Figure 12:
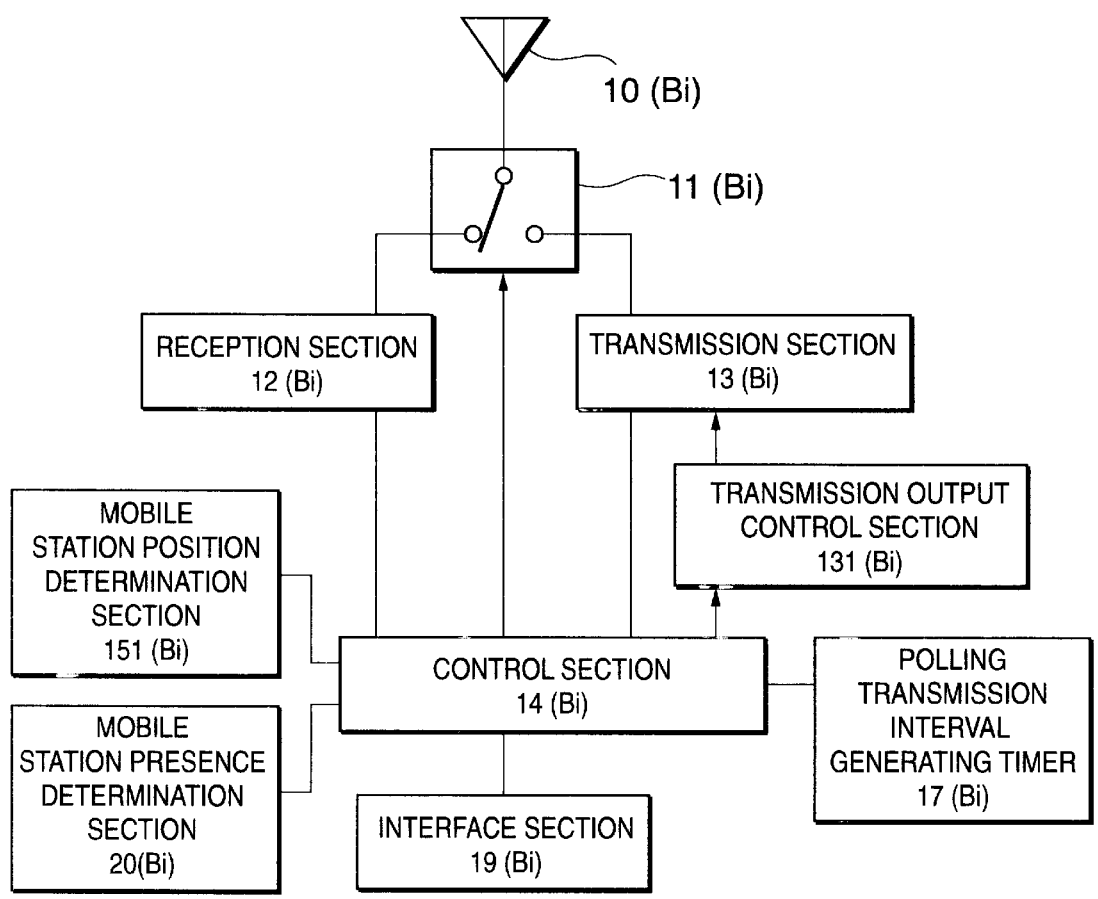
FIG. 12 is a block diagram showing another arrangement of a base station in the present invention.

FIG. 12 shows another arrangement of a base station in the present invention. According to this arrangement, a mobile station presence determination section $20(B_i)$ is added to the arrangement of the base station described above and is connected to the control section $14(B_i)$. As described above, the base station $B_i$ alternately transmits long- and short-distance polling signals.

If a polling response signal is returned in response to a long-distance polling signal, the mobile station presence determination section $20(B_i)$ determines that the mobile station is present inside the large zone formed by the base station $B_i$. Otherwise, the mobile station presence determination section $20(B_i)$ determines that the mobile station is not present in the large zone. The mobile station presence determination section $20(B_i)$ then sends the corresponding information to the control section $14(B_i)$. When the control section $14(B_i)$ determines, on the basis of the determination result sent from the mobile station presence determination section $20(B_i)$, that the mobile station is not present in the large zone formed by the base station $B_i$, the control section $14(B_i)$ stops the origination of a short-distance polling signal, and continuously transmits a long-distance polling signal. If it is determined that the mobile station is present in the large zone, long- and short-distance polling signals are alternately originated, as described above.

Figure 13:
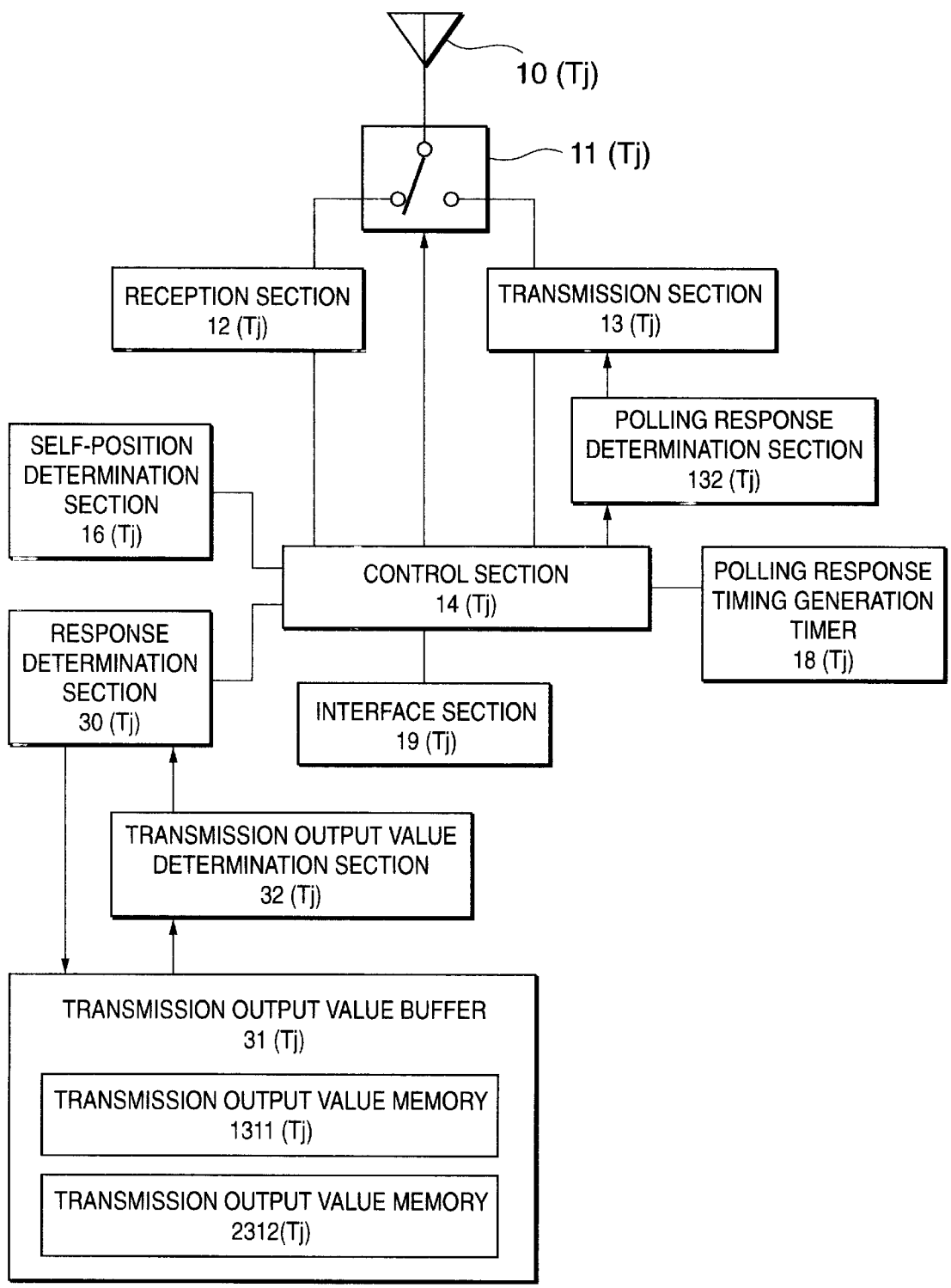
FIG. 13 is a block diagram showing another arrangement of a mobile station in the present invention.

FIG. 13 shows another arrangement of the mobile station in the present invention. According to this arrangement, a response determination section $30(T_j)$, a transmission output value buffer $31(T_j)$, and a transmission output value determination section $32(T_j)$ are added to the arrangement of the above mobile station and are connected to the control section $14(T_j)$.

Upon reception of a polling signal from a base station, the control section $14(T_j)$ processes the polling signal to obtain the transmission output value of the polling signal in the above-described manner. The control section 14($T_j$) sends the transmission output value to the response determination section 30($T_j$). The response determination section 30($T_j$) sends the transmission output value sent from the control section 14($T_j$) to the transmission output value buffer 31($T_j$).

The transmission output value buffer 31($T_j$) includes two transmission output value memories 311($T_j$) and 312($T_j$) capable of storing transmission output values. Upon reception of a transmission output value from the response determination section 30($T_j$), the transmission output value buffer 31($T_j$) stores the transmission output value, stored in the transmission output value memory 311($T_j$), in the transmission output value memory 312($T_j$), and stores the transmission output value, sent from the response determination section 30($T_j$), in the transmission output value memory 311($T_j$).

If no data is stored in the transmission output value memory 311($T_j$), the transmission output value sent from the response determination section 30($T_j$) may be simply stored in the transmission output value memory 311($T_j$). With this operation, the transmission output value of the currently received polling signal and the transmission output value of the previously received polling signal are respectively stored in the transmission output value memories 311($T_j$) and 312($T_j$).

If no transmission output value is sent from the control section 14($T_j$) for a predetermined period of time, the response determination section 30($T_j$) clears the transmission output value memories 311($T_j$) and 312($T_j$) in the transmission output value buffer 31($T_j$). The transmission output value determination section 32($T_j$) refers to/processes the transmission output value in the transmission output value buffer 31($T_j$) to check whether the polling signal is a long- or short-distance polling signal, and sends the determination result to the response determination section 30($T_j$). The response determination section 30($T_j$) generates and outputs a determination result indicating whether to transmit a polling response signal on the basis of the determination result sent form the transmission output value determination section 32($T_j$).

FIG. 14 shows the determination results sent from the transmission output value determination section 32($T_j$) and the response determination results obtained by the response determination section 30($T_j$). As shown in FIG. 14, the determination results sent from the transmission output value determination section 32($T_j$) are classified into six patterns. Of the six patterns, patterns 1 to 4 correspond to whether the mobile station is located inside the large or small zone in the radio zone formed by the base station.

Pattern 1 corresponds to a case wherein the mobile station is located inside the large zone of the base station. Patterns 2 and 3 correspond to a case wherein the mobile station is located inside the small zone. Pattern 4 corresponds to a case wherein the mobile station is located in the small zone but fails to receive a long-distance polling signal for some reason, and the short-distance polling signal received before last is left in the transmission output value buffer 31($T_j$). Patterns 5 and 6 correspond to a case wherein the transmission output value buffer 31($T_j$) is empty because, for example, the mobile station is located in an area that does not belong to any of the radio zones of the base stations, and no polling signal is received within a predetermined period of time.

The response determination section 30($T_j$) determines, on the basis of the determination result obtained by the transmission output value determination section 32($T_j$), a specific pattern, of the six patterns, to which the current and previous polling signals correspond. Assume that the response determination section 30($T_j$) determines pattern 2, in which the currently received polling signal is a long-distance polling signal and the previously received polling signal is a short-distance polling signal. In this case, a determination result indicating that no response is to be made is output to the control section 14($T_j$). If pattern 1, 3, 4, 5, or 6 is determined, a determination result indicating that a polling response signal is to be output to the base station in response to the polling signal is output to the control section 14($T_j$). On the basis of this determination result, the control section 14($T_j$) controls transmission/non-transmission of a polling response signal.

According to the above description of the embodiment of the present invention, the transmission output of a polling signal is controlled in two steps. However, the transmission output of a polling signal may be controlled in three or more steps. However, since the propagation of radio waves is influenced by environments, when transmission output control is performed in multiple steps, a distinctive radio zone may not be formed in some case. For this reason, the number of steps must be set within the range in which the boundaries between radio zones remain distinct.

In addition, according to the description of the embodiment of the present invention, small zones are formed by base stations such that the small zones formed by the respective adjacent base stations do not overlap, as shown in FIG. 7. However, the present invention is not limited to this arrangement. The sizes of large and small zones can be arbitrarily set in accordance with the system to which the present invention is applied.

Although the number of radio channels is not specifically limited in the present invention, the present invention is effective especially for radio communication using a signal frequency.

What is claimed is:

1. A radio communication system which comprises a plurality of base stations and a plurality of mobile stations belonging to service areas covered by radio zones respectively formed by said base stations and performs data communication by polling, each of said plurality of base stations comprising transmission output control means for controlling a transmission output of a polling signal to alternately transmit a long-distance polling signal having a strong transmission output and a short-distance polling signal having a weak transmission output, thereby alternately forming large and small radio zones, and means for receiving responses from said plurality of mobile stations to the long- and short-distance polling signals and determining a specific one of the large and small zones in which each of said mobile stations is located.

2. A system according to claim 1, wherein each of said plurality of base stations continuously transmits only the long-distance polling signal without transmitting the short-distance polling signal when there is no mobile station that responds to the long- and short-distance polling signals.

3. A system according to claim 1, wherein each of said plurality of mobile stations makes no response when the polling signal received following the short-distance polling signal is the long-distance polling signal.

4. A system according to claim 1, wherein when different data need to be transmitted to said plurality of mobile stations, each of said base stations preferentially transmits the data to a mobile station which is located in the large zone formed by each of said plurality of base stations but is not located in the small zone.

5. A system according to claim 2, wherein when different data need to be transmitted to said plurality of mobile stations, each of said base stations preferentially transmits the data to a mobile station which is located in the large zone formed by each of said plurality of base stations but is not located in the small zone.

6. A system according to claim 2, wherein the small zones respectively formed by said plurality of base stations are arranged such that the small zones formed by said adjacent base stations do not overlap.

7. A system according to claim 4, wherein the small zones respectively formed by said plurality of base stations are arranged such that the small zones formed by said adjacent base stations do not overlap.

8. A radio communication system which comprises a plurality of base stations and a plurality of mobile stations belonging to service areas covered by radio zones respectively formed by said base stations and performs data communication by polling, each of said plurality of base stations comprising transmission output control means for controlling a transmission output of a polling signal to alternately transmit a long-distance polling signal having a strong transmission output and a short-distance polling signal having a weak transmission output, thereby alternately forming large and small radio zones, and means for receiving responses from said plurality of mobile stations to the long- and short-distance polling signals and determining a specific one of the large and small zones in which each of said mobile stations is located, wherein each of the polling signals has an ID for identifying a base station which has originated the polling signal and a transmission output value indicating whether the polling signal is the long-distance polling signal or the short-distance polling signal, and each of said plurality of mobile stations determines, from an ID number of said base station and the transmission output obtained by receiving the polling signal, a specific one of the large and small radio zones in which said mobile station is located and a specific one of said plurality of base stations which forms the radio zone in which said mobile station is located.

* * * * *